United States Patent [19]

Waibel

[11] Patent Number: 4,668,862

[45] Date of Patent: May 26, 1987

[54] METHOD AND APPARATUS FOR DETERMINING MEASURED QUANTITIES WITH A CENTROID DETECTING ENCODER

[75] Inventor: Reinhard Waibel, Berneck, Switzerland

[73] Assignee: Wild Heerbrugg Aktiengesellschaft, Heerbrugg, Switzerland

[21] Appl. No.: 790,778

[22] Filed: Oct. 24, 1985

Related U.S. Application Data

[63] Continuation-in-part of Ser. No. 461,129, Jan. 26, 1983, abandoned.

[30] Foreign Application Priority Data

Feb. 9, 1982 [CH] Switzerland ............................ 785/82

[51] Int. Cl.[4] .............................................. G01D 5/34
[52] U.S. Cl. ............................ 250/231 SE; 250/237 G
[58] Field of Search ........ 250/231 R, 231 SE, 237 G; 340/347 P; 356/395

[56] References Cited

U.S. PATENT DOCUMENTS

| | | | |
|---|---|---|---|
| 3,748,043 | 7/1973 | Zipin | 250/237 G |
| 4,100,420 | 7/1978 | Metcalf et al. | 250/231 SE |
| 4,342,910 | 8/1982 | Pfeifer et al. | 340/347 P |
| 4,384,204 | 5/1983 | Tamaki et al. | 250/237 G |
| 4,439,672 | 3/1984 | Salaman | 250/231 SE |

Primary Examiner—David C. Nelms
Attorney, Agent, or Firm—Helfgott & Karas

[57] ABSTRACT

A plurality of marks are carried on a movable member, the position of which represents a measured quantity. An image of a mark is projected onto a surface having a large number of detectors. The output signals of the detectors are fed into an evaluation circuit, which sequentially determines the intensity distribution on the detector and, thereby, the position of the mark by means of comparison of fixed threshold values with each of the detector signals and determines the centroid of the thus obtained intensity value distribution. The position of the centroid is a measure of the quantity to be measured.

33 Claims, 5 Drawing Figures

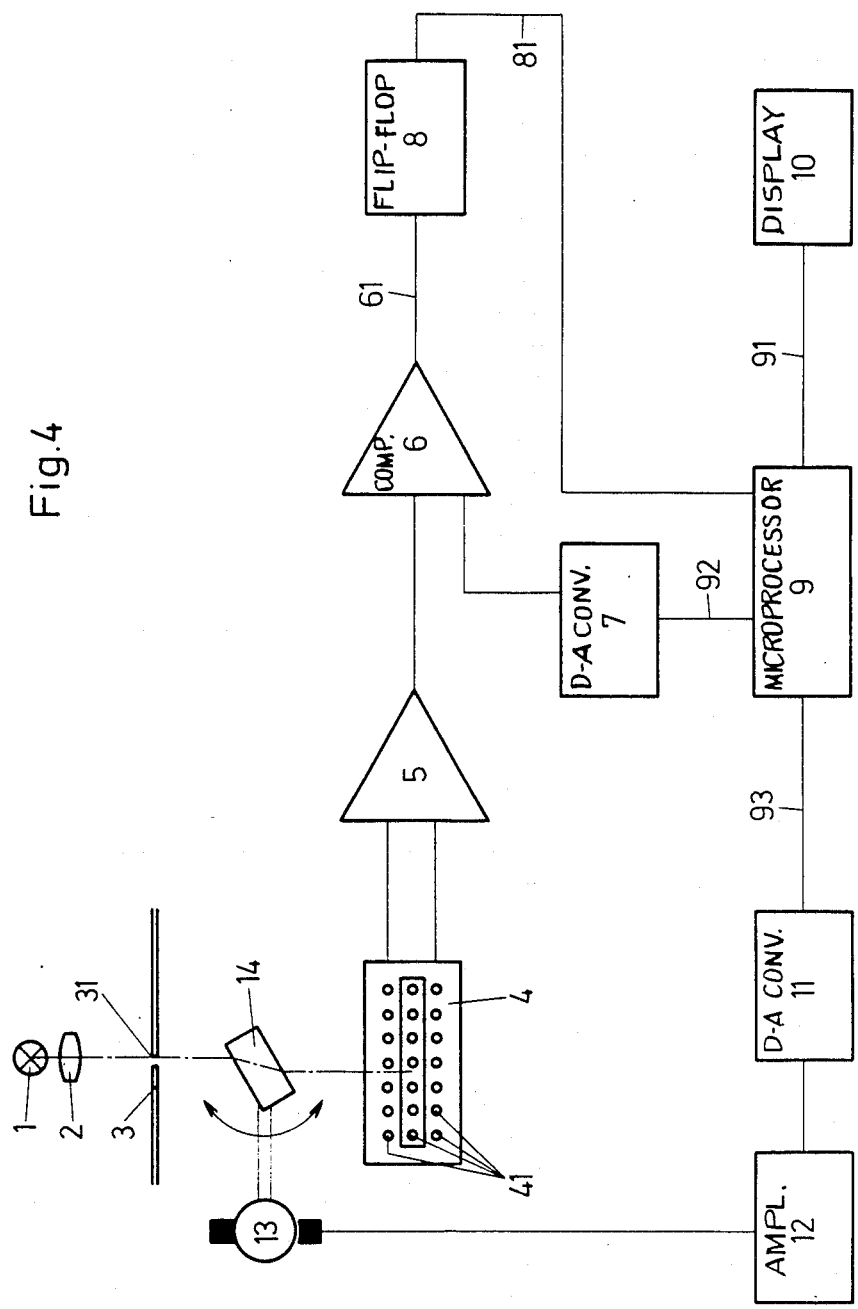

METHOD AND APPARATUS FOR DETERMINING MEASURED QUANTITIES WITH A CENTROID DETECTING ENCODER

This is a continuation-in-part of application Ser. No. 461,129 filed Jan. 26, 1983, now abandoned.

This invention relates to a method and apparatus for determining measured quantities by projecting marks on a moveable member onto a surface containing detectors, and including an evaluation system and display means for displaying the result of the evaluation.

BACKGROUND OF THE INVENTION

High precision is desired in measurements of lengths or angles. Known measuring instruments used for these purposes, such as geodesic instruments, are designed in such a way that the operator reads the measured quantity from an analog scale usually formed by optical marks such as, for example, lines, gaps or numeric characters, or from a digital display. The technique of actually determining the measured quantity from the display device differs from one technique to another. The reading of scales is subjective but has the advantage of low apparatus cost. It is much more accurate to read from a digital display, but the devices necessary to produce an accurate digital display is normally somewhat more expensive. As is well known, geodesic measuring instruments such as, for example, theodolites, must have a small, simple and light-weight construction with limited power consumption. These instruments must also remain maintenance-free for many years and permit operation over that interval of time with the same reliable precision. Additionally, these instruments must be able to withstand very rough treatment since they are used in open country.

These requirements are not met by known digital measuring systems such as are described, for example, in German Offenlegungsschrift No. 2,211,235 and U.S. Pat. No. 3,973,119. It follows, for example, that static measuring systems have a precision which is not adequate for use as geodesic instruments. However, incremental measuring systems are sensitive to interruptions of the power supply because the angle or length value must be incrementally determined and stored as the value of the dimension changes. Finally, high-precision dynamic measuring systems are very complicated and costly and have drive and control systems which are sensitive to wear. Thus, these known measuring systems are expensive and complicated and must be frequently maintained and serviced during operation by highly paid technical individuals or else they are imprecise and, additionally, these systems do not have simple, reliable construction.

BRIEF DESCRIPTION OF THE INVENTION

An object of the invention is to overcome the disadvantages of known measuring systems and provide a method for measuring and displaying the results of measurement, which is accurate, simple and can be implemented by an apparatus which is inexpensive and requires minimum maintenance and service.

Briefly described, the invention includes a method for determining the magnitude of a measured quantity in a system of the type including a member movable in accordance with variations in the quantity magnitude, optically distinguishable marks on the movable member, a surface having a plurality of detectors, means for projecting an image of a portion of the member on the surface, and an evaluation circuit connected to receive electrical output signals from the detectors for quantizing the image values including the steps of establishing threshold values for the signals from the detectors, determining the intensity distribution of the image by sequentially comparing each detector output signal with the threshold values, determining the position of the centroid of the distribution pattern thus determined, and displaying the centroid position as a measure of the quantity.

In another aspect, the invention involves an apparatus for determining and displaying the magnitude of a measured quantity in a system of the type including a member movable to positions representing the quantity magnitude and means on the member defining distinctive marks, the combination comprising a plurality of detectors, each of said detectors being capable of producing an electrical signal representative of the incident intensity thereof; means for supporting said detectors in a predetermined array along a surface; means for producing an image of a portion of the movable member and for projecting the image onto said surface, the intensity distribution pattern of said image being representative of the position of marks on said member; means for sequentially comparing the signals produced by said detectors with a plurality of threshold signals; means for generating, from the results of said comparison, an output signal representative of the centroid location of the distribution pattern; and means for displaying said output signal as a measure of the magnitude of the quantity.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 4 is a schematic circuit diagram, in block form, of a further embodiment of an evaluation system.

DETAILED DESCRIPTION OF THE PREFERRED EMBODIMENTS

Figure 3:
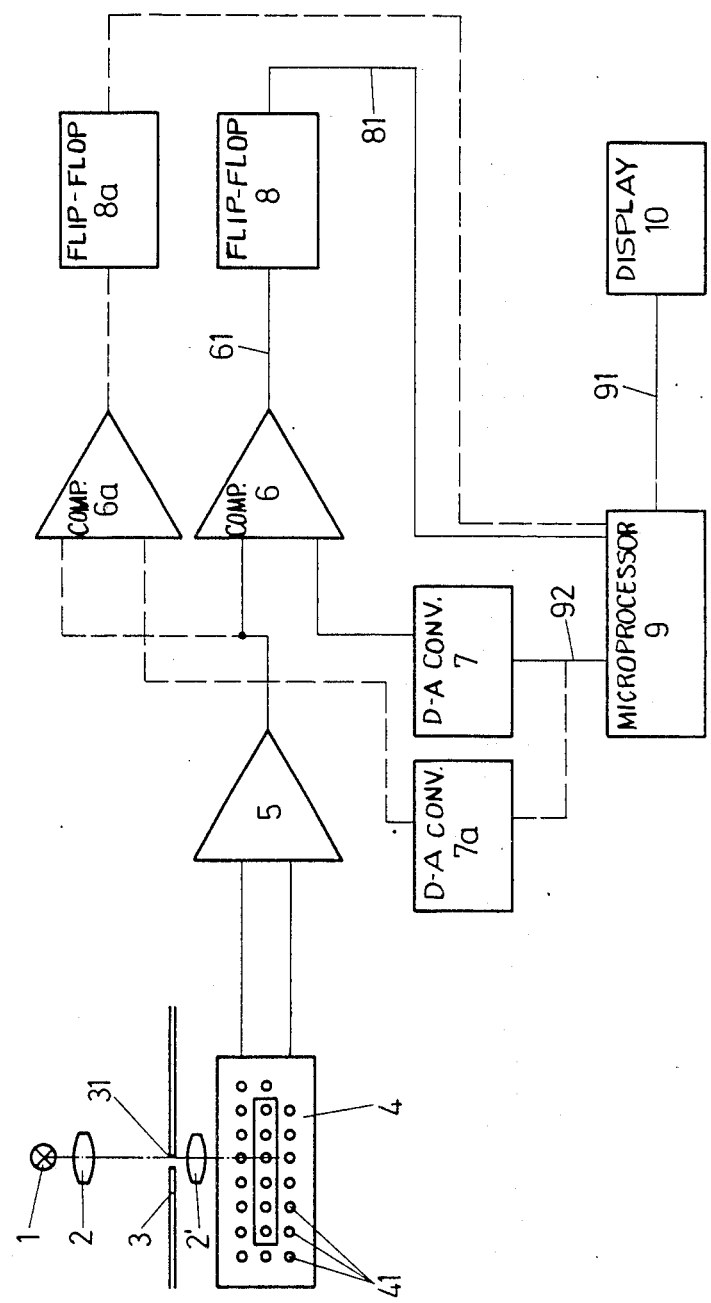
FIG. 3 is a schematic circuit diagram, in block form, of a system for evaluating the measured quantity from the optical information.

The method and the apparatus according to the present invention is described first of all with respect to a goniometer which represents a typical example of the use of the present invention. The main parts of such a device are depicted in Figs. 3 and 4. The present apparatus has a member 3 bearing a measuring path. This member 3 is placed between a radiation source 1 and a support 4 bearing radiation sensitive elements 41. Optical means, e.g. lenses 2 and 2' can be placed in the path of the radiation emitted by said source 1. Member 3 and support 4 are movable with respect to each other. In the described preferred embodiment the support 4 and the radiation source 1 are stationary whereas said member 3 is movable. The support 4 can be attached to a stationary part whereas the member 3 can be attached to a movable part of a goniometer comprising a telescope.

Said member 3 can be a flat disc the margin of which is provided with said path or scale. But said member 3 can also be a flat annular member, a short cylinder and so on. In the drawings the movable member 3 is depicted as a flat annular member laying perpendicular to the plane of the paper.

Said support 4 can also be a flat member and it also lays normally perpendicular to the plane of the paper. However, in FIGS. 3 and 4 said support 4 is turned by 90 degrees so that it lays in the plane of the paper in order to show the arrangement of said radiation sensitive elements 41 thereon. Between the neighboring radiation sensitive or responsive elements 41 a spacing 22 of a predetermined and known length is provided. Said elements 41 form a row or array on the support 4 the direction of which coincides at least partly with the movement direction of the movable part of the present apparatus having said measuring path. From FIGS. 3 and 4 it is apparent that a number of rows or arrays consisting of said radiation sensitive elements 41 is placed on the surface of the support 4 whereby these arrays are parallel to each other and their direction coincides at least partly with the direction of movement of the movable part of the present apparatus.

In the embodiments depicted in the drawings, said source 1 is a light source, said parts 2 and 2' are optical lenses and the radiation sensitive elements 41 are light detectors. Other arrangements are also possible.

Figure 2:
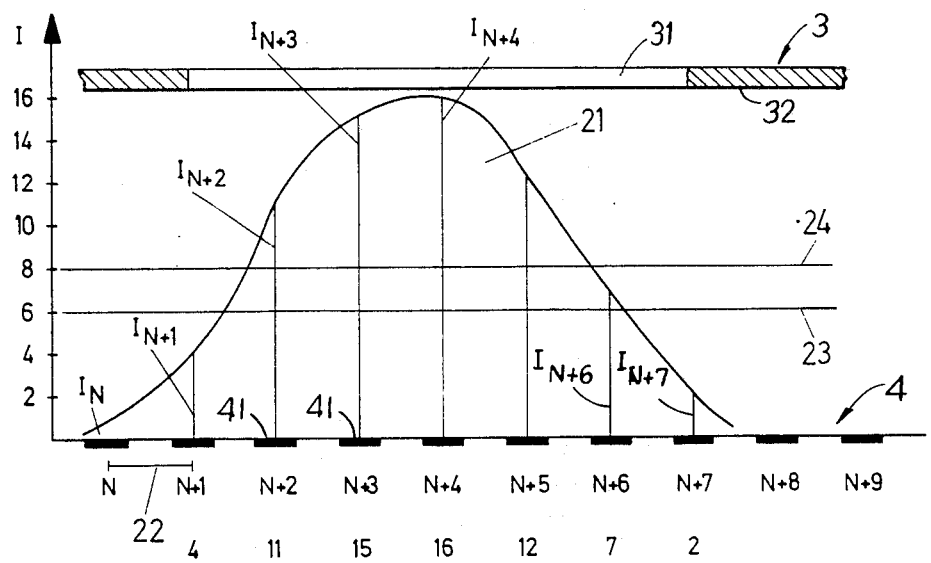
FIG. 2 is a graphical presentation of a typical intensity distribution of the optical response of a photodetector array in accordance with the invention to the projection of a scale according to FIG. 1.

The measuring path of the movable member 3 comprises at least one mark 31 (FIGS. 2, 3 and 4) which is transparent to the radiation of the source 1. The remaining part 32 of this member 3 is opaque to said radiation. Said radiation, after it passed said mark 31, irradiates the radiation sensitive elements 41 placed on the support 4. In FIG. 2, one section of one of said arrays, consisting of the light sensitive elements 41, is depicted. The radiation passing through said mark 31 and impinging on said elements 41 causes an electrical signal in those elements 41 of said array which are illuminated through said mark 31. Because of the diffraction effect, also those sensitive elements 41 of said section are irradiated which are under the opaque margins 32 of said mark 31. Radiation impinging on said detectors 41 causes electrical signals therein. The magnitude of these electric signals delivered by the respective detector 41 is indicated in FIG. 2 by the length of perpendiculars $I_N$, $I_{N+1}$, $I_{N+2}$, and so on to the corresponding detector 41.

The position of each of said sensitive elements 41 is predetermined and these positions are denoted by N, N+1 to N+9. The magnitude or intensity 1N, 1N+1 to $I_N$, $I_{N+1}$, $I_{N+2}$, to $1_{N+7}$ of the electric signals delivered by the respective sensitive element 41 having the position N, N+1 and so on can be read out from the left hand part of FIG. 2. In the lower part of FIG. 2, there are example intensities 1=4, 1=11 and so on given belonging to the respective one of the perpendiculars 1N, 1N+1 to 1N+7. One may draw a line or a curved plane connecting the end points of said perpendiculars 1N, 1N+1 . . . and such curve can be considered as a pattern 21 showing a distribution of the intensity of the electric signals from the detectors 41 over the mark 31.

According to FIG. 3, the individual radiation sensitive elements 41 are connected by a matching circuit 5 to a comparator 6. The output 61 of the comparator 6 is connected by a flip-flop circuit 8 and a line 81 to one input of a microprocessor 9 which can treat the output signals of the comparator 6. One of the outputs 91 of the microprocessor 9 is connected to a display unit 10 for displaying the measured values. Another output 92 of the microprocessor 9 is connected by a digital-to-analog converter 7 to another input of said comparator 6.

If necessary, a further digital-to-analog converter 7a can be provided, the output of which is connected to a further comparator 6a. The output of the comparator 6a is coupled by a further flip-flop circuit 8a to a further input of the microprocessor 9.

The signals of the individual photodetectors 41 have different intensities indicated, as already stated, by $I_N$ through $I_{N+7}$. These signals from the individual photodectectors 41 pass from the arrangement 4 to the matching circuit 5 which is shown in the embodiment of FIG. 3 as a differential amplifier. Said signals can be coupled from the photodectectors 41 in a sequential mode to the amplifier 6 via the lines illustrated in FIG. 3 or, alternatively, each individual photo-responsive cell 41 can be connected by its own line to the respective matching amplifier 5. In either case, the individual signals reach a comparator 6 which also receives reference signals of predetermined level from the digital-to-analog converter 7. These reference signals are indicated by the lines 23, 24 in FIG. 2. The magnitude of the respective photodectector intensity signal $I_N$, $I_{N+1}$ to $I_{N+7}$, which are also diagramatically shown in FIG. 2, will be compared with the respective level signals 23, 24 and so on.

When comparing e.g. the first reference signal 23 with said intensity signals $I_N I_{N+1}$ to $I_{N+7}$, only some of these signals from the photodectectors 41, namely the signals $I_{N+2}$ to $I_{N+6}$ exceed the threshold value 23. The electric values of the points of intersection between the level 23 and the end point of the respective perpendicular I or expressed in other way, of the points of intersection between the respective level 23, 24 and so on and the pattern 21, will be detected in the comparator 6. These electric values will be stored in the microcomputer 9 whereby this storage occurs related with the respective one sensitive element 41. As already stated, these elements 41 have a known position N, N+1 and etc., on the support 4. In this way, the form or shape of the pattern 21 will be converted to electric signals which can be stored in the microprocessor 9.

It is assumed that the peak value of said pattern 21 lays in the middle of the mark 31. Now, said microprocessor 9 can compute from the coordinates of said points of intersection, which represent a digital expression of the form of said pattern 21, the centroid or barycentric point of this pattern 21. Because it is known to the microprocessor 9 what place said detectors 41 have on the support 4 and because it assumes that said barycentric point of said pattern 21 is in the middle of the length of the mark 31, it can display in the device 10 an exact position of the movable member 3 with respect to the support 4.

This embodiment of the present invention is usable where said support 4 and said member 3 are relatively short. For other cases, a further embodiment of the present apparatus is necessary. This further embodiment can have a member 3 which is as long as necessary for measuring the whole given length. The support 4, having said detectors, is only as long as in the preceding embodiment. In this case it is necessary first of all to ascertain which of the sections of the movable part 3 of the present apparatus is over the support 4. To this end, the movable member 3 is subdivided into intervals 33 which are spread over the length of the member 3 in the direction of movement thereof. The boundaries of these intervals 33 are given by broad marks 31a. Between two boundary marks 31a, there are further marks 31b, 31c or 31d which are narrower than said boundary marks 31a and which also extend in the direction of movement of the member 3. Said interior marks 31b to 31d serve to code the respective one of the intervals 33. By aid of this code it is possible to determine which one of the intervals or sections 33 of the movable member 3 is over the arrangement having said detectors 41. To form a code, said interior marks 31b to 31d are spread over the length of the respective interval in a manner specific for each interval 33. The direction of the row of the interior marks 31b to 31d coincides also at least partly with the direction of movement of the movable member 3.

Between the respective marks 31a, 31b, 31c and 31d intermediates 32 are placed. If the marks 31a, 31b, 31c and 31d are transparent to the radiation of the radiation source 1 then the intermediates 32 are of a material which is opaque to said radiation, and vice versa.

Figure 1:
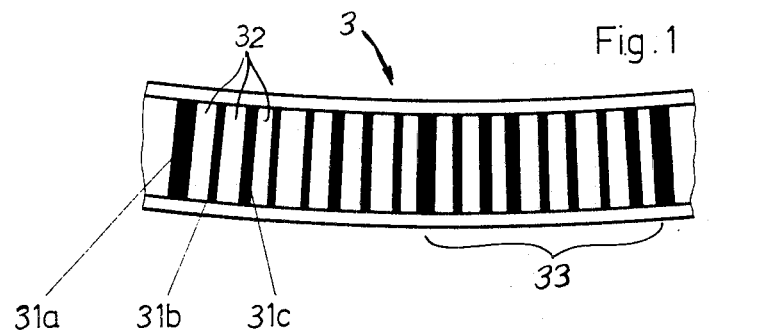
FIGS. 1 and 1A are schematic partial plan views of scales having coded optical marks thereon.

The scale member 3 according the FIG. 1 comprises marks 31a, 31b, 31c having different lengths but the center-to-center distance between these marks is the same, i.e. they are equidistant. These marks are depicted as dark but in fact they are transparent whereas the intermediates 32 are opaque. The widest marks 31a identify the end of the respective interval 33 of the scale member 3. The narrow or short marks 31b and the medium marks 31c serve for coding the number of the respective interval 33, i.e. they provide a distinctive code capable of identifying the particular interval. By selecting the line widths and by using different binary codes, as many as 128 intervals can be distinctively coded. This coding makes it possible to subdivide the quantity to be measured into intervals having known positions.

Figure 1A:
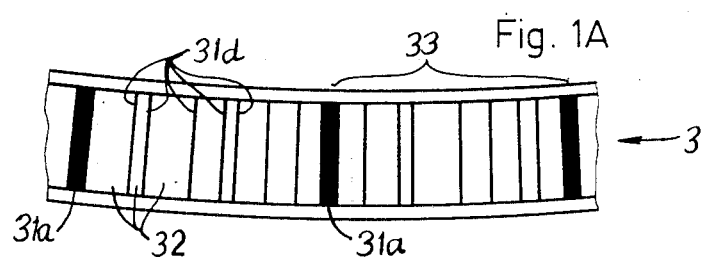

The scale 3 according to FIG. 1A shows a section of the scale member 3, the length of which is subdivided by the boundary marks 31a also into intervals 33. Within each interval 33 coding marks 31d are spread whereby all interior marks 31d have the same length but they are arranged displaced from the equidistant positions within the respective interval. By such a distribution of said marks 31d, the number of the respective interval 33 can be coded so that the number of the respective interval can be recognized. The coding marks 31d are depicted in FIG. 1A as dark but in fact they are transparent whereas the intermediates 32 are opaque. The widest marks 31a identify also in this case the end of the respective interval 33 on the scale member 3.

The individual photodetectors have different intensities indicated, as examples, by $I_N$ through $I_{N+4}$. These signals from the individual photodetectors pass from the arrangement 4 to a matching circuit 5 which is constructed in the embodiment of FIG. 3 as a differential amplifier. In this connection, it should also be mentioned that the signals can be coupled in a serial or sequential fashion to the amplifier 5 via the two lines illustrated in FIG. 3 or, alternatively, each individual photo-responsive cell 41 can be connected by its own "dedicated" line to the matching amplifier. In either case, the individual signals reach a comparator 6 which also receives reference signals in a predetermined order from a digital-to-analog converter 7, and the reference signals are compared with the individual photodetector intensity signals as also diagrammatically shown in FIG. 2. It is assumed therein that a reference signal 23 is compared with the intensity signals. Only some of the photodetectors, namely N+2 through N+6 have intensity signals which are higher than the threshold value 23. In the present embodiment, the intensity signals of all of the photodetectors are compared with signals at the level of threshold value 23. The resulting signals pass through line 61 to a monostable multivibrator or flip-flop circuit 8. From converter 7, a further reference signal is then delivered to comparator circuit 6 where it is used as a threshold value 24, also shown in FIG. 2. The comparison between this new threshold value and the intensities from each of the photodetectors then takes place in the same way as described in connection with value 23. Further threshold signals can then be formed and compared with the intensity signals until no further signal passes from comparator circuit 6 to the monostable multivibrator 8. As an alternative, multivibrator 8 can be a flip-flop which is reset by computer 9.

FIG. 3 also shows an additional circuit, connected with dashed lines, which illustrates an optional further embodiment including a comparator circuit 6a, a digital-to-analog converter 7a and a monostable multivibrator 8a. The operation of these three components is the same as described in connection with circuits 6, 7, and 8. This additional circuit is used to permit the intensity signals of the photodetectors 41 to be compared simultaneously with two different threshold values. As will be recognized, further identical circuits can be added to the embodiment of FIG. 3 making it possible to compare the intensity signals from the photodetectors simultaneously with a larger number of threshold values. While this does not fundamentally alter the operation of the system, it considerably reduces the measuring time.

The output signals of comparator 6, 6a represent the quantized information representative of the intensity distribution of the optical marks 31. In monostable multivibrators 8, 8a these very short signals undergo time lengthening and the lengthened signals are then supplied to a microprocessor 9 on line 81 in such a way that the intensity quantization is sequentially transferred for one threshold value, i.e., for one set of intensity signals which exceed each threshold value. After receiving all of the quantized signals for the intensities which exceed all of the threshold values, it is a simple matter to calculate the centroid of the complete signal distribution 21 in microprocessor 9. the centroid of this signal distribution is recognized in computer 9 as being representative of the quantity to be measured, either a length or an angle dimension, depending upon the apparatus. It is also possible for the intensity signals of the individual photodetectors 41 to be weighted with different factors in computer 9. This can be used to change the shape of the distribution curve changing it so that, for example, the distribution 21 becomes larger in the center, in the region of N+3 and N+4.

Thus, the processor establishes the measured quantity represented by optical marks 31. However, as the optical mark designated 1c in FIG. 1 was calculated in the present embodiment and that mark is located in an interval or division, it is also necessary for the computer 9 to work out the coding of the particular interval so that the interval can be appropriately recognized. As stated in connection with FIG. 1, each interval is coded with optically differentiable marks 1a, 1b, 1c. These marks have different widths but, in the present embodiment, equidistant spacing. The different widths of the marks provide computer 9 with the necessary information about the interval in which the mark 1c, which has just been calculated, is positioned. This information, together with the centroid information, is supplied by the computer to a display unit 10 on line 91. The quantity to be measured is then completely indicated in the display. As has already been stated, this quantity can either be a length of an angle dimension.

Another possibility for the coding of the interval can be provided by optically identical marks with variable spacing, as shown in FIG. 1A at 32.

Computer 9 supplies, on line 92, the predetermined reference signals to the digital-analog converter 7 or 7a as previously described. However, it should be recognized that for automatic intensity matching of the threshold distribution, it is possible to modify the reference signals supplied by computer 9. Such intensity matching is necessary because, during the operation period, either the light source 1 or the sensitivity of photodetectors 41 on surface 4 can change in an uncontrolled fashion. It can be assumed, for example, that the sensitivity of the photodetectors has been reduced by aging which means that the intensity distribution 21 no longer reaches the threshold values when, previously, they exceeded those values. Computer 9 recognizes the existence of a condition in which the intensity distribution peak no longer exceeds the maximum threshold value and either reduces the threshold values so that they can again be triggered by the distribution 21 or, alternatively, light source 1 is supplied with a higher level of illumination current so that, despite the reduced sensitivity of the photodetectors, the previous threshold values can again be triggered. It is also possible to carry out the aforementioned weighting of the different intensity signals in such a way that the distribution 21 is applied at the desired points. Thus, as a result of the measuring principle described, automatic intensity matching is always present. This optimizes the ratio of the threshold values 23, 24 and other values to the maximum intensity of the threshold value distribution 21 throughout the operating period.

FIG. 4 shows essentially the same components as the embodiment of FIG. 3 with the difference that a compensating device is arranged between scale 3 and surface 4 which carries photodetectors 41. This compensating device, which includes a beam displacement element 14 and a drive motor 13, is controlled by microprocessor 9 through a digital-to-analog converter 11 and an amplifier 12. For an explanation of the operation of the compensating device, it will be assumed that scale 3, on which are arranged the optical marks 31 (FIG. 4) or 1a, 1b, 1c (FIG. 1) moves in accordance with the measuring process. The optical marks 31 crossing the light beam from source 1 are projected onto the photodetectors 41. As has already been described in connection with FIGS. 2 and 3, this results in an intensity distribution 21 which is determined in the evaluation circuits 5–9. If it is found that the centroid of the distribution is not precisely in its zero position when the measuring apparatus is measuring an angle or quantity of zero magnitude, computer 9 supplies an output signal on line 93 to digital-to-analog converter 11 which, through amplifier 12, activates electric motor 13 in such a way that the beam displacement element 14, which can be a prism, is rotated in one of two possible directions as indicated by the arrow. Rotation is continued until the centroid of the distribution 21 has again assumed its zero position. This automatic compensation ensures that the optical measuring marks which must be used for a measuring process have the same zero position on surface 4, increasing the measuring accuracy.

Although, the method has been described in connection with an optical system, the same method can be used with a system including any radiation source, for instance X-ray photon radiation source. Photodetectors 41 then would be replaced by usual radiation-responsive detector devices.

While certain advantageous embodiments have been chosen to illustrate the invention it will be understood by those skilled in the art that various changes and modifications can be made therein without departing from the scope of the invention as defined in the appended claims.

What is claimed is:

1. A method for ascertaining a quantity to be measured, such as an angle or a length, by means of a system including:
   a movable part and a motionless part,
   a scale member coupled to one of said parts,
   a radiation source,
   an arrangement having an array of elements sensitive to radiation from said source, said arrangement being coupled to the other of said two parts and connected to a circuitry for evaluation of the signals delivered by this arrangement,
   and comprising an image of at least one mark on said scale member whereby the width of said image of said mark is greater than the effective length of a plurality of said radiation sensitive elements so that at least one section of the array corresponding to said plurality of the radiation sensitive elements is associated with one mark, comprising the steps of,
   forming a signal in the sensitive elements irradiated through said mark having magnitudes dependent upon the position of the respective element with respect to said mark,
   producing a distribution pattern of said magnitudes,
   providing a reference level,
   detecting values corresponding to points of intersection between said distribution pattern and said reference level,
   changing said reference level stepwise between consecutive pairs of said producing and comparing steps,
   summarizing the results fo said comparisons whereby this summarization takes place for each said radiation sensitive element of said array of sensitive elements,
   computing the position of a centroid, i.e. of a barycentric point of said pattern the form of which is determined by said distribution of the magnitudes produced by the radiation sensitive elements associated with a said mark through which said sensitive elements are irradiated,
   evaluating the position of said barycentric point with respect to location of the radiation sensitive elements on the arrangement, this arrangement having a defined position on one of said two parts of the apparatus, and
   displaying the results of said computation and evaluation steps.

2. A method as claimed in claim 1, wherein said pattern is a two dimensional pattern.

3. A method as claimed in claim 1, and using a system in which the scale member is provided with a number of marks and in which a section of the array of the radiation sensitive elements is associated with each of said marks, wherein the position of the barycentric point of each mark of the pattern delivered by each section of radiation sensitive elements is computed, the computed positions of said centroids are averaged with respect to one of the centroids, and wherein the value resulting from this averaging is related to one end portion of said array of the radiation sensitive elements.

4. A method as claimed in claim 1, wherein the maximum value of said distribution of said magnitudes is recognized and wherein the maximum value of the reference levels needed to determine the form of said pattern is changed so that it reaches at least said maximum value of the pattern.

5. An apparatus for ascertaining a quantity to be measured, such as an angle or a length, including:
a movable part and a motionless part,
a scale member coupled to one of said parts,
a radiation source,
an arrangement having an array of elements sensitive to the radiation of said source, said arrangement being coupled to the other of said two parts and connected to circuitry for evaluation of the signals delivered by this arrangement,
at least one mark on said scale member, the width of this mark being greater than the length of one of said radiation sensitive elements so that a section of said array of the radiation sensitive elements in associated with said mark,
means for forming a signal in the sensitive elements irradiated through said mark having magnitudes dependent on the position of the respective elements with respect to said mark,
means for producing a distribution pattern of said magnitudes,
means for detecting values corresponding to points of intersection between said distribution pattern and a reference level,
means for changing this reference level stepwise,
means for summation of the results of said comparison whereby this summarization takes place for each said radiation sensitive element of said array,
means for computation of the barycentric point of said pattern the form of which is determined by said distribution of the magnitudes produced by the radiation sensitive elements associated with said mark through which said sensitive elements are irradiated,
means for evaluation of the position of said barycentric point with respect to the location of the radiation sensitive elements on the arrangement, this arrangement having a defined position on one of said two parts of the apparatus,
means for displaying the output of said computation and evaluation means, and
said array of sensitive elements extending in the direction of movement of the movable part of said apparatus.

6. An apparatus as claimed in claim 5, wherein said scale member is coupled with the movable part of the apparatus and wherein the support for the radiation sensitive elements is coupled with the motionless part.

7. An apparatus as claimed in claim 5, wherein the scale member is provided with a number of boundary marks and wherein these marks are distributed in a direction which coincides at least partly with the direction of movement of said movable part of the apparatus.

8. An apparatus as claimed in claim 7, wherein said boundary marks subdivide the scale member into intervals coded by an appropriate distribution of interior marks and wherein the width of each respective coded interval is smaller than the length of the radiation sensitive arrangement.

9. An apparatus as claimed in claim 8, wherein the centers of said interior marks are equidistantly spread from each other, the width of these marks are different from each other and wherein such interior marks are distributed over the respective interval in such a manner that the intervals of the scale member are distinguishable each from the other.

10. An apparatus as claimed in claim 8, wherein said interior marks all have the same width and wherein the positions of such marks with respect to each other are chosen in the interior of each of the intervals so that said intervals are distinguishable from each other.

11. An apparatus as claimed in claim 5, wherein said scale member is provided with an additional array of said marks.

12. An apparatus as claimed in claim 5, wherein a compensating device is placed between the scale member and the radiation sensitive arrangement to reestablish the distribution of the magnitudes over the width of the respective mark which was present prior to movable part of the apparatus being displaced in accordance with the value to be measured.

13. An apparatus as claimed in claim 12, wherein said compensating device comprises a beam displacing element movably arranged between the scale member and the radiation sensitive arrangement, said element being coupled to a motor and wherein this motor is driven by said circuitry.

14. An apparatus as claimed in claim 5, wherein said radiation source is a light source, said radiation sensitive elements are photodetectors, wherein an optical system is associated with said light source and said mark, and wherein said optical system comprises at least one lens placed between said light source and said mark.

15. An apparatus as claims in claim 5, wherein said radiation sensitive elements are connected through a matching circuit to at least one comparator another input of which is connected to an output of circuitry which is producing said reference levels for transformation of the form of said pattern into corresponding digital values, and said circuitry receiving said digital values from said comparator and delivering the computed value of the quantity to be measured to said display means.

16. A method for determining the magnitude of a measured quantity in a system which includes a stationary member and a member which moves in proportion to the quantity to be measured, comprising the steps of providing a plurality of distinguishable marks on one of said stationary and movable members, providing a plurality of detectors on the other of said stationary and movable members, projecting an image of each said mark onto at least some of said detectors in said pluarlity of detectors, said detectors producing output signals which quantify the images projected thereon whereby said at least some of said detectors produce a distribution pattern of said output signals corresponding to the projected image of each said mark, determining said magnitude of said measured quantity by determining the centroid of said pattern; and said step of determining the centroid being performed by repetitive steps of establishing a threshold value of said output signals, comparing said threshold value to said distribution pattern and changing said threshold value.

17. The method of claim 16, and the steps of subdividing said plurality of marks into a plurality of individually coded intervals each including some of the marks in said plurality of said marks, and determining said magnitude of said measured quantity by identifying a particular one of said individually coded intervals.

18. The method of claim 16, wherein said marks are of varying widths and are uniformly spaced with respect to each other.

19. The method of claim 16, wherein said marks are of uniform width and are spaced with varying spacing with respect to each other.

20. Apparatus for determining the magnitude of a measured quantity in a system which includes a stationary member and a member which moves in proportion to the quantity to be measured, a plurality of distinguishable marks on one of said stationary and movable members, a plurality of detectors on the other of said stationary and movable members, wherein each of said detectors provides output signals which quantify the image projected thereon, means for projecting an image of each said mark onto at least some of said detectors in said plurality of detectors and the detectors subjected to said image being adapted to produce a distribution pattern of their output signals corresponding to said projected image of each said mark, means for determining the magnitude of said measured quantity by determining the centroid of said pattern; and said last mentioned determining means including means for establishing a threshold value of said detector output signals and means for comparing said threshold value to said distribution pattern and means for changing said threshold value.

21. The apparatus of claim 20, and means for subdividing said plurality of marks into a plurality of individually coded intervals with each of said intervals including some of said plurality of marks, and said means for determining said magnitude of said measured quantity being performed by means for identifying a particular one of said individually coded intervals.

22. The apparatus of claim 20, wherein said marks are of varying widths and are uniformly spaced with respect to each other.

23. The apparatus of claim 20, wherein said marks are of uniform width and are spaced with varying spacing with respect to each other.

24. The apparatus of claim 20, said means for projecting including optical means.

25. The apparatus of claim 20, and compensating means, said compensating means being adapted to produce a starting zero value for said means for establishing said threshold value.

26. The apparatus of claim 20, wherein said marks are placed one after the other in the movement direction of the movable one of said members so that a row of the marks coincides at least partly with the movement direction of said movable member and said marks being shaped such that they are distinguishable each from the other so that this row of the marks makes it possible to carry out at the same time the rough and the fine measurement of the position of the movable member with respect to the stationary member of the apparatus.

27. The apparatus of claim 26, wherein boundary marks subdivide the scale member into intervals the direction of which coincides at least partly with the movement direction of the movable member, and wherein said intervals are coded by an appropriate distribution of interior marks to distinguish these intervals each from the other.

28. The apparatus of claim 27, wherein said marks are of varying widths and are uniformly spaced with respect to each other.

29. The apparatus of claim 27, wherein said marks are of uniform widths and are spaced with varying spacing with respect to each other.

30. The apparatus of claim 20, wherein the scale member is coupled with the movable member of the apparatus and wherein a support for the radiation sensitive elements is coupled with the motionless member.

31. The apparatus of claim 20, and a compensating device between the scale member and the radiation sensitive arrangement for re-establishing that one distribution of the intensity values over the length of the respective mark which was present before the movable member was displaced in accordance with the quantity to be measured.

32. The apparatus of claim 31, wherein said compensating device comprises a beam displacing element movably arranged between the scale member and the radiation sensitive arrangement, said beam displacing element being coupled with a motor, and said motor being driven by the output signal of said circuitry.

33. The apparatus of claim 20, wherein said radiation source is a light source, said radiation sensitive elements are photodetectors, an optical system arranged with respect to said light source and said mark, and said optical system comprising at least one lens placed between said light source and said mark.

* * * * *